United States Patent [19]

Linke et al.

[11] Patent Number: 4,683,837
[45] Date of Patent: Aug. 4, 1987

[54] APPARATUS FOR APPLYING A MIXED COMBINATION OF ADHESIVE AND RESIN TO CORRUGATED BOARD

[75] Inventors: Kaljo Linke, Carlingford; Raymond B. Neale, Loftus, both of Australia

[73] Assignee: N. B. Love Industries Pty. Limited, New South Wales, Australia

[21] Appl. No.: 858,459

[22] Filed: Apr. 30, 1986

[30] Foreign Application Priority Data

May 7, 1985 [AU] Australia ............................. PH0459

[51] Int. Cl.$^4$ ............................................. B05C 11/00
[52] U.S. Cl. .................................... 118/612; 118/694
[58] Field of Search ............................... 118/612, 694

[56] References Cited

U.S. PATENT DOCUMENTS 4,379,015  4/1983  Ware et al. ......................... 156/205

Primary Examiner—Bernard D. Pianalto
Attorney, Agent, or Firm—Weingarten, Schurgin, Gagnebin & Hayes

[57] ABSTRACT

An apparatus for manufacturing corrugated board by combining a non-waterproof starch based adhesive and a waterproofing resin continuously and in small quantities to ensure improved wet strength board performance.

2 Claims, 1 Drawing Figure

APPARATUS FOR APPLYING A MIXED COMBINATION OF ADHESIVE AND RESIN TO CORRUGATED BOARD

This invention relates to a method of manufacture of corrugated board and more particularly to a method of manufacture of high wet strength adhesives for use therein.

In the existing method of manufacture of corrugated board, starch based adhesives are prepared in a batch process and stored in tanks holding quantities sufficient for several hours of consumption by corrugating machines and involves mixing substantial volumes. The adhesive is fed directly from the storage tanks to glue-line stations on the corrugating machine.

Hitherto there has been no reliable method for measuring the wet strength performance of corrugated board adhesives. In a co-pending application, there is described a method for measuring the wet strength of the adhesive bond in corrugated board. It has now been found that the wet strength of the adhesive bond in the finished board falls substantially as a function of the residence time that the mixture is stored after the waterproofing resin has been mixed with the adhesive and prior to application of the adhesive.

Thus most waterproofing resins used by the corrugating industry lose their effectiveness due to premature crosslinking within a couple of hours, which can result in poor bonding, low production speeds and poor water resistance of the bonds produced. This is illustrated in the following Table I.

TABLE I

| SAMPLES | TIME ELAPSED AFTER RESIN ADDED | WET STRENGTH (NEWTONS/METER) |
|---|---|---|
| I | 45 MIN. | 139 |
| I | 2 HRS. | 122 |
| II | 30 MIN. | 236 |
| II | 2 HRS. | 184 |
| II | 3 HRS. | 165 |
| III | 45 MIN. | 214 |
| III | 2 HRS. | 126 |
| IV | 45 MIN. | 70 |
| IV | 2 HRS. | 34 |

An object of the present invention is a method of manufacture of corrugating adhesives and of corrugated board which improves the uniformity of wet strength of the adhesive bond in the finished board, or which otherwise improves the efficiency of the corrugating process.

According to one aspect the invention consists in a method of manufacture of corrugated board comprising the steps of, storing a waterproofing resin in a first container, storing a non-waterproof starch based adhesive in a second container, combining the resin and the adhesive in a predetermined ratio downstream of said first and second containers, mixing said resin and adhesive and feeding the mixed combination to the glue trays of a corrugating machine for application to board substantially without further storage.

Preferred embodiments of the invention enable production of corrugated board having a higher wet strength than hitherto achievable.

The herein described invention relates to a process for automatically dosing waterproofing resin additives to corrugating adhesives. The dosing is controlled such that small quantities of resin treated adhesive are being produced continuously. This eliminates the historical problems associated with short pot life of such resin treated adhesives, and enables higher levels of resin to be used to improve wet strength board performance.

BRIEF DESCRIPTION OF THE DRAWING

A preferred embodiment of the invention will now be described by way of example only with reference to the schematic diagram of FIG. 1.

DETAILED DESCRIPTION OF THE PREFERRED EMBODIMENT

Figure 1:
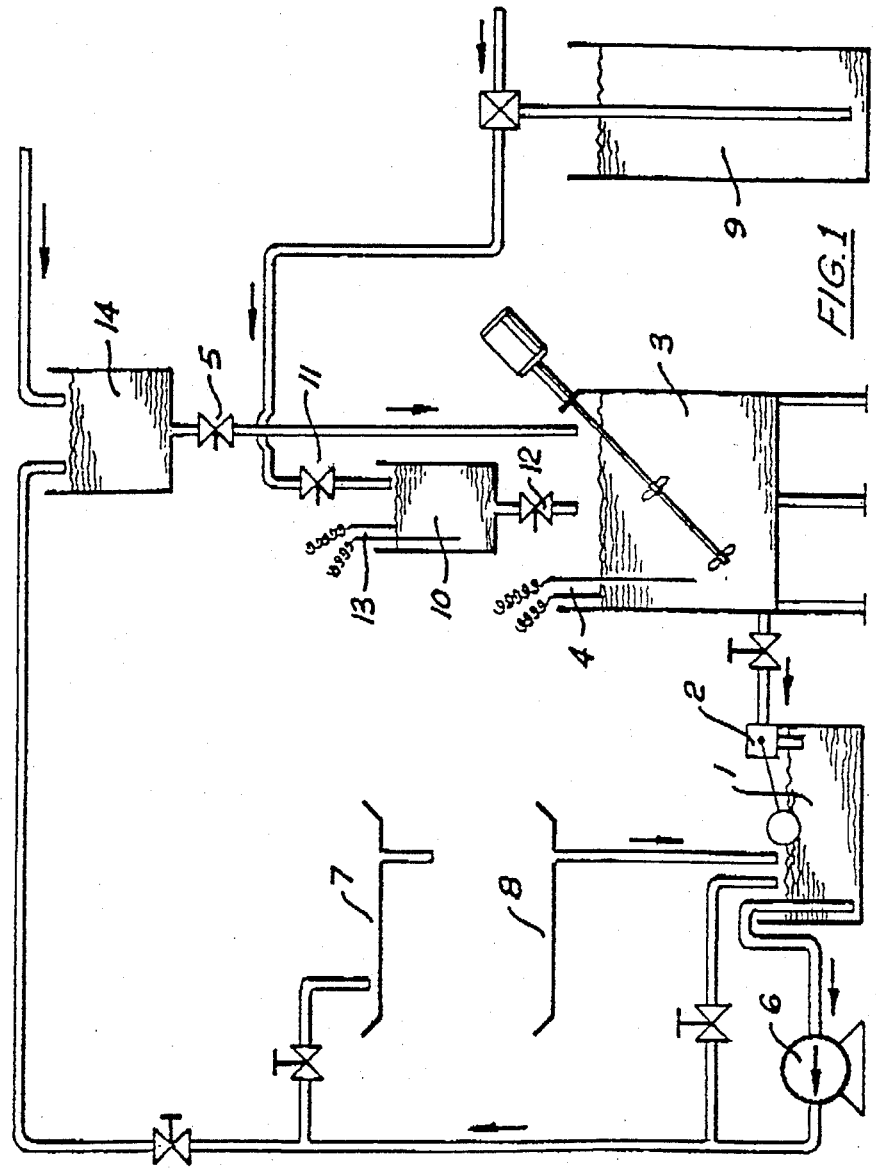

In the process illustrated, a small volume of non-waterproof starch based adhesive is treated with resin at each separate single facer and doublebacker station. This is accomplished at each station by connecting to the existing sump (1) via a float valve (2), a small stirred tank or in line mixing chamber (3) containing a high/low level control probe (4) and measuring the fresh adhesive supply to this tank (3) via a remotely controlled valve (5). The sump pump (6) which normally recycles the adhesive to the main storage tank, is altered to supply the adhesive trays (7,8) directly. Unless air operated pumps are used a bleed pipe and valve allowing some return to sump (1) is utilised to prevent pump burnout should the tray supply valve be closed accidentally.

Alternatively the float valve (2) can be replaced by an air activated or motorised valve, (directed by conductivity probes), to drop the treated adhesive from Tank (3) into the sump (1). An air operated pump can be used to deliver the treated adhesive from the sump (1) to the adhesive applicator trays where gravity returns it to the sump.

The waterproofing resin is held in either a bulk storage tank (9) or a disposable drum and is pumped to each individual station. In the preferred embodiment of the invention the resin is pumped to small dosing tanks (10) situated above each tank (3) via remotely controlled valves (11) with each tank also having a remote controlled valve (12) to measure the amount of resin added to tank (3).

Level control probes (13) in dosing tanks (10) allow two volumes of resin to be stored prior to addition. The higher volume of resin is added to the adhesive at the very start of the cycle to treat adhesive contained in the tanks (3), sumps (1) and trays (7,8). On subsequent cycles a lower volume of resin is added to treat only the fresh adhesive introduced into tank (3), since the adhesive in the sump and trays is already treated. The amount of adhesive treated on any given cycle is that required to provide not greater than two hours running at each station and preferably is an amount which will be consumed within 1 hour or less, thereby ensuring that relatively fresh waterproof adhesive is always used.

An alternative method of measuring the amount of resin to be added is to use a remotely controlled valve leading directly into tank (3). This valve would open for a set time to deliver a selected volume of resin at constant flow rate. The process can be modified to add more than one resin component if so desired, or a blend of aldehyde based resins or resins and catalysts, such as formaldehyde.

Adjustment of the level control probes in the dosing tank (10) enables any level of resin to be added. (Normally a higher resin level is used at the single facer stations than at the double facers.)

With some types of corrugators, the single facer sumps may need to incorporate a water jacket to cool the adhesive and reduce gelling in the trays.

Corrugating plants not using a "ring-main" adhesive system would need to install an air operated pump to facilitate supply interruption or alternatively install a bypass line and valve after the pump leading back into the storage tank (14).

The process described herein uses a programmable controller or relay bank to co-ordinate all the sequences involved.

It will be understood that tank (3) should be as small as possible consistent with satisfactory mixing Tank (3) is not intended for storage after mixing of the adhesive with the waterproofing resin since the adhesive should be applied as soon as possible.

By way of illustrating the improvement obtainable by the method of the invention, tests were conducted in which various resins and cross-linking chemicals were added to corrugating adhesives, principally starch and samples taken at various intervals. The adhesive samples were used to prepare in the laboratory small squares of corrugated board which were subsequently tested for wet strength.

It can be seen from the results in Table I that there was a marked drop in performance of the adhesive as time progresses and the resin cross-links.

In one example, water resistant corrugating adhesive (Sample A) was prepared by mixing together 458 g of commercially available liquid corrugating adhesive, 32 g of PR-900 (a commercially available resorcinol formaldehyde resin) and 20.5 g of formalin.

Test pieces of corrugated board were prepared in the laboratory 15 minutes, 1 hour, 2 hours and 3 hours after combination of the above ingredients. These test pieces were cured for 24 hours and tested for their water resistance strength. The results were as follows:

TABLE II

| Sample A | |
| --- | --- |
| Time Interval After Mixing | Water Resistance Force (g/cm) |
| 15 Mins | 224 |
| 1 Hour | 201 |
| 2 Hours | 173 |
| 3 Hours | The adhesive was too thick to use. |

Another sample (Sample B) was prepared by mixing 458 g of commercial corrugating adhesive, 24 g of PR-900 and 16 g of formalin. Test pieces were prepared at intervals of 15 mins, 1 hour and 3 hours after mixing. The water resistant results were as follows:

TABLE III

| Sample B | |
| --- | --- |
| Time Interval After Mixing | Water Resistance Force (g/cm) |
| 15 Mins | 170 |
| 1 Hour | 100 |
| 3 Hours | 79 |

These effects are even more pronounced with modern corrugating adhesives because high speed machines require low gel points which are obtained by increasing caustic soda levels in the formulation. Unfortunately most waterproofing resins are alkaline cured which further aggravates the pot life problem described above. Waterproofed adhesive which is kept overnight, or the weekend, often has to be dumped because if used, production speeds and bond quality deteriorate to an unacceptable level.

The method and apparatus hereindescribed may be varied to an extent which will be apparent to those skilled in the art from the teaching hereof without departing from the scope of the invention herein described.

We claim:

1. Apparatus for applying a mixed combination of non-waterproof adhesive and waterproofing resin to corrugated board comprising:
   (a) an adhesive storage tank;
   (b) a resin storage tank;
   (c) a mixing tank;
   (d) a sump;
   (e) a high/low level probe in said mixing tank controlling a valve for regulating the quantity of adhesive from said adhesive storage tank into said mixing tank;
   (f) a second high/low level probe in said resin storage tank controlling a valve for regulating the quantity of resin from said resin storage tank into said mixing tank whereby a predetermined quantity of resin is initially added to said mixing tank and a smaller quantity is continuously added thereafter and
   (g) means to deliver a portion of combined adhesive and resin to corrugated board and
   (h) means to return any unused portion thereof to said mixing tank or said sump.

2. Apparatus according to claim 1 wherein said means to deliver and means to return comprises a sump pump, an automatic valve controlling the volume of combined adhesive and resin in said sump and a bleed valve in parallel with a line from said pump to board.

* * * * *